United States Patent
McFearin et al.

(10) Patent No.: US 10,366,013 B2
(45) Date of Patent: Jul. 30, 2019

(54) CACHING STRUCTURE FOR NESTED PREEMPTION

(71) Applicant: Futurewei Technologies, Inc., Plano, TX (US)

(72) Inventors: Lee McFearin, Plano, TX (US); Sushma Wokhlu, Frisco, TX (US); Alan Gatherer, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 33 days.

(21) Appl. No.: 14/997,026

(22) Filed: Jan. 15, 2016

(65) Prior Publication Data

US 2017/0206173 A1    Jul. 20, 2017

(51) Int. Cl.
| | |
|---|---|
| *G06F 12/12* | (2016.01) |
| *G06F 12/08* | (2016.01) |
| *G06F 12/121* | (2016.01) |
| *G06F 12/0891* | (2016.01) |
| *G06F 12/0897* | (2016.01) |
| *G06F 12/0804* | (2016.01) |
| *G06F 12/126* | (2016.01) |

(52) U.S. Cl.
CPC ........ *G06F 12/121* (2013.01); *G06F 12/0804* (2013.01); *G06F 12/0891* (2013.01); *G06F 12/0897* (2013.01); *G06F 12/126* (2013.01); *G06F 12/12* (2013.01); *G06F 2212/1044* (2013.01); *G06F 2212/60* (2013.01)

(58) Field of Classification Search
CPC .............................. G06F 12/12; G06F 12/0891
See application file for complete search history.

(56) References Cited

U.S. PATENT DOCUMENTS

| | | | | |
|---|---|---|---|---|
| 2001/0011328 A1* | 8/2001 | Chung | ................... | G06F 12/128 711/128 |
| 2007/0277001 A1* | 11/2007 | Mevergnies | .......... | G06F 12/084 711/145 |
| 2013/0297876 A1* | 11/2013 | Yu | ......................... | G06F 12/122 711/122 |
| 2013/0339709 A1 | 12/2013 | Greiner et al. | | |

(Continued)

FOREIGN PATENT DOCUMENTS

| | | |
|---|---|---|
| CN | 104350462 A | 2/2015 |
| CN | 104714836 A | 6/2015 |
| WO | 2015135742 A1 | 9/2015 |

OTHER PUBLICATIONS

Lee et al. ("Enhanced analysis of cache-related preemption delay in fixed-priority preemptive scheduling," Real-Time Systems Symposium, 1997. Proceedings., The 18th IEEE , pp. 187-198).*

(Continued)

*Primary Examiner* — Charles Rones
*Assistant Examiner* — Tian-Pong Chang
(74) *Attorney, Agent, or Firm* — Vierra Magen Marcus LLP

(57) ABSTRACT

The present disclosure relates to a system and method of managing operation of a cache memory. The system and method assign each nested task a level, and each task within a nested level an instance. Using the assigned task levels and instances, the cache management module is able to determine which cache entries to evict from cache when space is needed, and which evicted cache entries to recover upon completion of preempting tasks.

19 Claims, 11 Drawing Sheets

| Nested Level | Task Instance | Status | Tag | Data Entry | |
|---|---|---|---|---|---|
| 1 | A | V | Addr1 | Cache Line1 | T1 |
| 2 | A | V | Addr2 | Cache Line2 | T2 |
| 2 | B | I | Addr3 | Cache Line3 | T3 |
| 3 | A | V | Addr4 | Cache Line4 | T4 |
| 3 | A | V | Addr5 | Cache Line5 | T4 |
| 3 | B | I | Addr6 | Cache Line6 | T5 |
| 2 | C | V | Addr7 | Cache Line7 | T6 |
| 2 | C | V | Addr8 | Cache Line8 | T6 |
| 2 | D | I | Addr9 | Cache Line9 | T7 |

(56) References Cited

U.S. PATENT DOCUMENTS

| | | | |
|---|---|---|---|
| 2015/0039379 A1* | 2/2015 | Brown | G06Q 10/06316 |
| | | | 705/7.26 |
| 2015/0169357 A1 | 6/2015 | Busaba et al. | |
| 2015/0277977 A1* | 10/2015 | Vrind | G06F 9/4881 |
| | | | 718/104 |
| 2015/0293793 A1* | 10/2015 | Vrind | G06F 9/4887 |
| | | | 718/103 |
| 2017/0116118 A1* | 4/2017 | Artieri | G06F 12/084 |

OTHER PUBLICATIONS

Altmeyer et al. ("Cache-related preemption delay via useful cache blocks: Survey and redefinition," Journal of Systems Architecture 57, 2011, pp. 707-719 ).*
Reineke et al., "Selfish-LRU: Preemption-Aware Caching for Predictability and Performance", 2014 IEEE 20th Real-Time and Embedded Technology and Applications Symposium (RTAS), Apr. 15-17, 2014.
PCT/CN2017/070654, ISR, Apr. 17, 2017.

\* cited by examiner

*Fig. 2*

| | Nested Level | Task Instance | Status | Tag | Data Entry | |
|---|---|---|---|---|---|---|
| 118 — | 1 | A | V | Addr1 | Cache Line1 | — T1 |
| 118 — | 2 | A | V | Addr2 | Cache Line2 | — T2 |
| 118 — | 2 | B | I | Addr3 | Cache Line3 | — T3 |
| 118 — | 3 | A | V | Addr4 | Cache Line4 | — T4 |
| 118 — | 3 | A | V | Addr5 | Cache Line5 | — T4 |
| 118 — | 3 | B | I | Addr6 | Cache Line6 | — T5 |
| 118 — | 2 | C | V | Addr7 | Cache Line7 | — T6 |
| 118 — | 2 | C | V | Addr8 | Cache Line8 | — T6 |
| 118 — | 2 | D | I | Addr9 | Cache Line9 | — T7 |

(126: Nested Level; 128: Task Instance; 124: Status; 122: Tag; 120: Data Entry)

Fig. 5

| Nested Level | Task Instance | Status | Tag | Data Entry | |
|---|---|---|---|---|---|
| 1 | A | V | Addr1 | Cache Line1 | T1 |
| 2 | A | V | Addr2 | Cache Line2 | T2 |
| 2 | B | V | Addr3 | Cache Line3 | T3 |
| 2 | E | V | Addr10 | Cache Line10 | T8 |
| 3 | A | V | Addr5 | Cache Line5 | T4 |
| 3 | B | V | Addr6 | Cache Line6 | T5 |
| 2 | C | V | Addr7 | Cache Line7 | T6 |
| 2 | C | V | Addr8 | Cache Line8 | T6 |
| 2 | D | V | Addr9 | Cache Line9 | T7 |

*Fig. 6*

| Nested Level | Task Instance | Status | Tag | Data Entry | |
|---|---|---|---|---|---|
| 1 | A | V | Addr1 | Cache Line1 | T1 |
| 2 | A | V | Addr2 | Cache Line2 | T2 |
| 2 | B | V | Addr3 | Cache Line3 | T3 |
| 2 | E | V | Addr10 | Cache Line10 | T8 |
| 3 | A | V | Addr5 | Cache Line5 | T4 |
| 3 | C | V | Addr11 | Cache Line11 | T9 |
| 2 | C | V | Addr7 | Cache Line7 | T6 |
| 2 | C | V | Addr8 | Cache Line8 | T6 |
| 2 | D | V | Addr9 | Cache Line9 | T7 |

*Fig. 7*

| Nested Level | Task Instance | Status | Tag | Data Entry | |
|---|---|---|---|---|---|
| 4 | A | V | Addr12 | Cache Line12 | ← T10 |
| 2 | A | V | Addr2 | Cache Line2 | T2 |
| 2 | B | V | Addr3 | Cache Line3 | T3 |
| 2 | E | V | Addr10 | Cache Line10 | T8 |
| 3 | A | V | Addr5 | Cache Line5 | T4 |
| 3 | C | V | Addr11 | Cache Line11 | T9 |
| 2 | C | V | Addr7 | Cache Line7 | T6 |
| 2 | C | V | Addr8 | Cache Line8 | T6 |
| 2 | D | V | Addr9 | Cache Line9 | T7 |

CACHING STRUCTURE FOR NESTED PREEMPTION

BACKGROUND

A computing system may use a cache memory to improve computing performance. For instance, a computing system may store data that it needs to access more frequently in a smaller, faster cache memory instead of storing the data in a slower, larger memory (e.g., a main memory unit). Accordingly, the computing system is able to access the data quicker, which can reduce the latency of memory accesses.

Real time and general time sharing operating systems typically use nested preemption in scheduling tasks and interrupts. For example, fixed priority systems will preempt a currently running process when a higher priority process becomes ready to run. When this happens, the information about the currently running process is saved and it is not used until the higher priority process has finished running. For example, consider that Task X is preempted by Task Y and Task Y is then preempted by Task Z. Task Z will finish running first and Task Y will resume. Once Task Y finishes running, Task X will resume. The benefit of preemption is that the higher priority Task Z is allowed to run sooner and handle its more urgent work before its deadline.

However preemption has costs. The first cost is the overhead required to save the information of Task X and switch to Task Y. Then the cost is incurred again to save the information of Task Y and switch to Task Z. Operating systems and hardware have been designed to minimize this cost. The second cost is termed Cache Related Preemption Delay (CRPD). When higher priority tasks run, if space is not available in cache memory, they will evict cache entries from current tasks. This will cause the current task to miss the cache when it resumes execution and have to wait for data from the more distant main memory.

This cost is worsened by the typical Least Recently Used (LRU) caching strategies. Under LRU, data associated with older tasks are evicted before data associated with more recent tasks. Thus, in the above example, when Task X brings back in data it needs, the remaining cache entries for preempted Task X will be evicted first to make room for the new data, and the entries for higher priority Task Y and Task Z will be preserved even though they have completed execution. Studies have shown that the impact of CRPD can be as high as 44%.

SUMMARY

In one embodiment, the present technology relates to a computing device comprising: a cache memory comprising a plurality of cache entries, each cache entry being assigned a nested level of the cache entry, and an instance identifier (ID) at the nested level; a processor receiving a new task at a nested level n and with an instance ID x, the new task at level n preempting a task in progress at a nested level m less than n. In embodiments, the technology further comprises a cache management module comprising a cache replacement module, wherein the cache replacement module replacing a selected cache entry with a new cache entry for the new task.

In embodiments, the selected cache entry may be one of: (a) a cache entry in the cache memory with invalid data; (b) a cache entry in the cache memory at the nested level higher than n; (c) a cache entry in the cache memory at the nested level n and with the instance ID different than x; (d) a cache entry in the cache memory at the nested level lower than n; or (e) a cache entry in the cache memory at the nested level n and with the instance ID x.

In another embodiment, the present technology relates to a method for operation of a cache memory, the cache memory comprising a plurality of cache entries, each cache entry being assigned a nested level of the cache entry, and an instance identifier (ID) at the nested level, the method comprising: receiving a preemptive task assigned a nested level n and an instance ID x when performing a first task at a nested level m, wherein n>m; suspending the first task at the nested level m; and performing the preemptive task assigned the nested level n.

In a further embodiment, the present technology relates to a method of implementing a cache recovery module for operation of a cache memory, the cache memory comprising a plurality of cache entries, each cache entry being assigned a nested level of the cache entry, the method comprising: receiving an indication that a task at a nested task level has been completed; fetching a selected cache entry from a cache buffer based on the indication that the task at a nested task level has been completed, the selected cache entry fetched from the cache buffer being a cache entry that was evicted from the cache memory; and recovering the selected cache entry back into the cache memory.

In a further embodiment, the present technology relates to a non-transitory computer-readable medium storing computer instructions for cache memory management, that when executed by one or more processors, cause the one or more processors to perform the steps of: configure a cache memory comprising plurality of cache entries, wherein each cache entry being assigned a nested level, and each cache entry being assigned an instance identifier (ID) indicating respective tasks at the nested level; receive a preemptive task at a nested level n and an instance ID x when performing a first task at a nested level m, wherein n>m; suspend the first task at the nested level m; and perform the preemptive task at the nested level n.

In embodiments, the non-transitory computer-readable medium further stores computer instructions for cache memory management, that when executed by one or more processors, cause the one or more processors to recover an evicted cache entry back into the cache memory upon completion of a task, the evicted cache entry being a cache entry that was previously evicted from the cache memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2 is a schematic illustration of a cache memory according to embodiments of the present technology.

FIGS. 5-8 illustrate replacement of cache entries in a cache memory according to embodiments of the present technology.

DETAILED DESCRIPTION

The present technology, roughly described, relates to a system and method implementing a cache management module for managing the operation of a cache memory. The cache management module assigns each nested task a level, and each task within a nested level an instance. Using the assigned task levels and instances, the cache management module is able to implement two sub-modules for intelligent handling of cache line replacement and recovery. A first sub-module referred to herein as the replacement module replaces cache entries when space is needed in a way that evicts completed tasks first and is least likely to evict cache entries for upcoming function calls. This reduces the likelihood of a cache miss and having to retrieve data from the main memory.

When one or more cache lines are replaced, a second sub-module referred to herein as the recovery module checks whether the replaced cache entries are for an as-yet to be finished preempted task. If so, the recovery module stores the one or more cache entries or cache entry addresses for the preempted task in a local memory location such as a first in-first out FIFO data buffer. Upon completion of a task, cache entries at a lower preempted level which are most likely to be used again are pre-fetched from the data buffer and returned to the cache memory. This further reduces the likelihood of a cache miss and the need to access main memory.

As will be appreciated by one skilled in the art, aspects of the present disclosure may be illustrated and described herein in any of a number of patentable classes including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "module." Furthermore, aspects of the present disclosure may take the form of a computer program product embodied in one or more computer readable media having computer readable program code embodied thereon.

Figure 1:
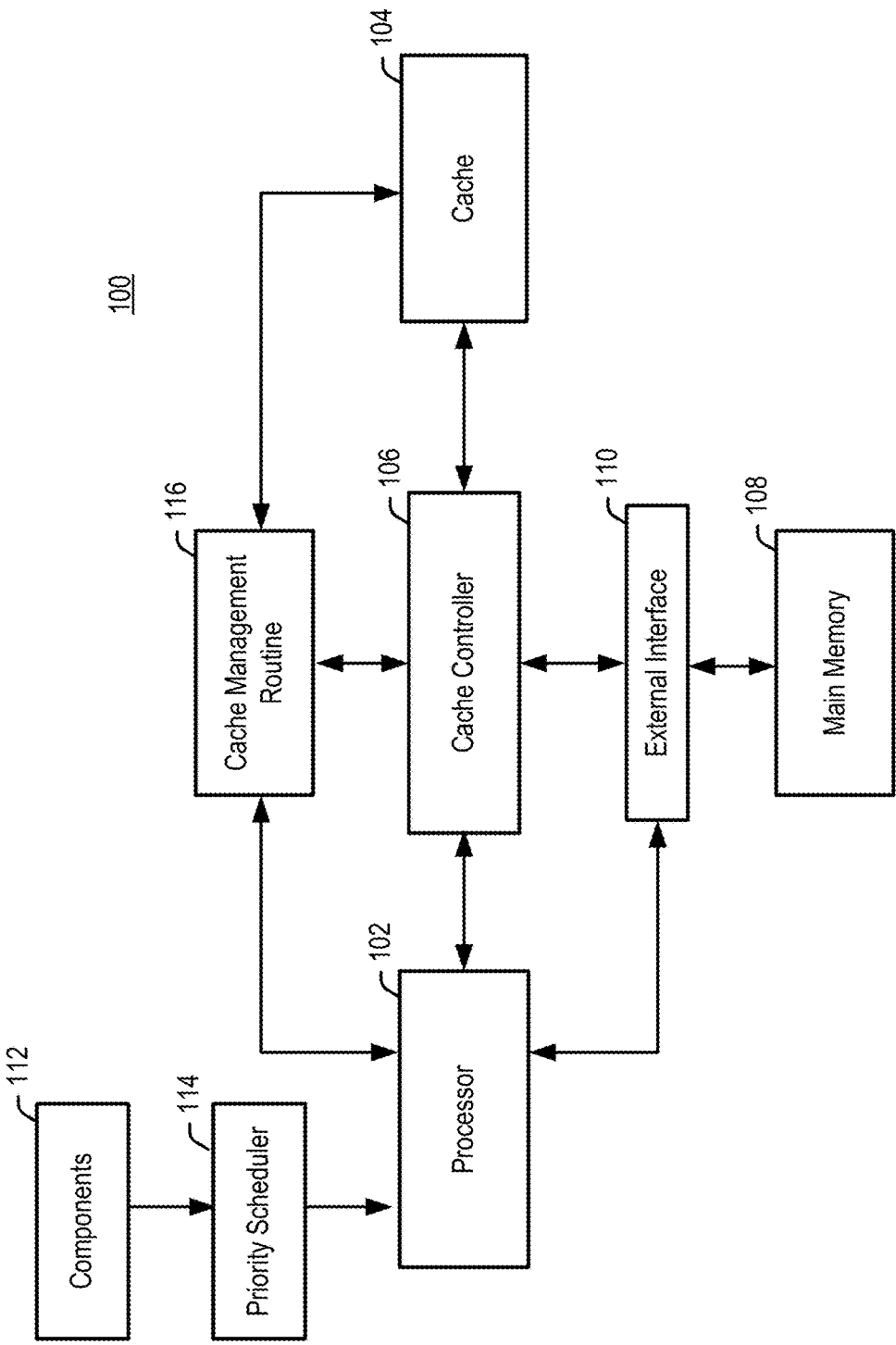
FIG. 1 is a schematic illustration of a computing device according to embodiments of the present technology.

FIG. 1 is a schematic diagram of a computing device 100 for implementing aspects of the present technology. Computing device can be any of a wide variety of computing devices, including for example a desk top, lap top, tablet, smart phone, server, distributed computing device, smart appliance, etc. Embodiments are not limited to any particular computing device and can be practiced in environments that are different than the specific example shown in FIG. 1.

Computing device 100 includes a processing unit 102 (also referred to herein as a processor) communicating with a cache memory 104 via a cache controller 106. Processing unit 102 is also in communication with a main memory 108 via a memory bus and an external communications interface 110. Processing unit 102 performs tasks, including for example any processing, logic operations, computations, function calls, etc. that are needed in the operation of the computing device 100. In its operation, the processing unit retrieves data for performance of a task, including for example programming steps, from the cache memory 104 first and provides a result as an output. If not found in the cache memory 104 (a cache miss), the processor retrieves the data from the main memory 108. Tasks may come from any of a variety of components (generically shown at 112) of the computing device 100. Each task may have an associated priority or deadline assigned by a scheduler 114 as is known.

In embodiments, cache memory 104 may be any of a variety of high speed memory components including for example a static RAM (SRAM). The main memory 108 may a slower memory component including for example dynamic RAM (DRAM). In embodiments described below, the processor may look for data from a single cache memory 104, and if not found, then look for the data in the main memory 108. However, as is known, the cache memory 104 may comprise a hierarchical arrangement, including multiple levels of cache (e.g., L1, L2, L3). It is also understood that the cache memory 104 may comprise separate data and instruction caches.

When the processing unit 102 needs to read or write a location in main memory 108, it first checks for a corresponding entry in the cache memory 104. If the processing unit finds that the memory location is in the cache memory, a cache hit has occurred. However, if the processing unit 102 does not find the memory location in the cache memory 104, a cache miss has occurred. In the case of a cache hit, the processing unit 102 allocates a new entry in the cache memory 104, and copies in data from main memory 108. The request is fulfilled from the contents of the cache memory 104.

In order to make room for the new entry on a cache miss, the cache memory may have to evict one of the existing entries. For example, as indicated above, the processor 102 may operate using a nested preemption scheme, where lower priority tasks get preempted by higher priority tasks, as determined by the scheduler 114. In order to make room for data for the higher priority task(s), data for lower priority tasks may be replaced, or evicted. Additionally, where data for a lower priority future task has been replaced, it may need to be recovered in the future. The computing device 100 may further implement a cache management module 116 for determining when to replace cache entries and when to recover cache entries. Cache management module 116 may include any data, instructions, algorithms, etc. needed to manage the operations of the cache memory 104.

In accordance with aspects of the present technology, the cache management module 116 may include a replacement module defining how the cache memory 104 will remove or evict cache entries when the cache memory 104 needs to make space available for new data. In accordance with further aspects of the present technology, the cache management module 116 may include a recovery routing defining how the cache memory recovers evicted data for lower priority tasks, or scheduled tasks that have yet to be performed by the processing unit 102.

The replacement module and the recovery module make use of a nested level indicator and an instance indicator that are assigned each task and which are stored in cache memory 104 in association with each task. FIG. 2 is a schematic illustration of how cache memory 104 may store cache entries 118 including tasks and data. As is known, each cache entry 118 may include a data block from the main memory stored as cache lines 120. As is further known, each cache entry may further include a tag 122 that includes the address of the data in the main memory unit, and a status bit 124. The status bit 124 can be used to indicate whether or not a cache block has been loaded with valid data. Cache entries 118 may further include a dirty bit (not shown) indicating whether the associated cache line 120 has been changed since it was read from main memory (dirty), meaning that the processing unit 102 has written data to that line and the new value has not propagated all the way to main memory 108. It is understood that cache 104 may include more cache entries 118 than are shown.

As indicated above, the processing unit 102 may operate according to a nested preemption scheme, where lower priority tasks are preempted by higher priority tasks, and before a task at level n is resumed, all higher priority tasks at levels >n are completed. Where space is needed in cache memory for data for higher priority tasks, cache entries for lower priority tasks may be removed or evicted. In accordance with aspects of the present technology, each cache entry 118 may further include a nested level 124 and an instance 126 in order to keep track of cache entries that may be removed. In embodiments, nested levels 124 may be expressed as integers and instances may be expressed as letters. However, it is understood that nested levels may be expressed by other sequential indicators and/or instances may be expressed by other sequential indicators in further embodiments.

When a first task and later preemptive tasks are received, the processing unit 102 assigns each such task the next successive incremental nested level (level, 1, 2, 3, etc.). When a task T1 at level m is preempted by a new task T2, the task T2 is performed at nested level n, where n=m+1. If nested level n is a new level (i.e., no tasks have previously been performed at nested level n), the processing unit assigns the first instance (e.g., A) to the task T2 at the new level n. On the other hand, if one or more tasks have previously been performed and completed at nested level n, then task T2 is assigned the next successive incremental instance (instance B, C, D, etc.) in order to distinguish the task T2 from the one or more tasks previously performed at nested level n. This scheme is further illustrated with reference to the examples of FIGS. 2 and 5-7.

In example illustrated in FIG. 2, the processing unit first performs a task T1. This task was assigned a nested level/instance 1A. Task T1 was preempted by a higher priority task T2, which was assigned a nested level/instance 2A. Task T2 was completed and execution by the processor returned to the first nested level 1. However, before completion of Task T1, another higher priority task T3 came in. This task is performed at nested level 2. In order to distinguish task T3 from task T2, also performed at nested level 2, the instance of task T3 is incremented so that the nested level/instance of Task T3 is 2B.

In the example of FIG. 2, Task T3 is interrupted by Task T4. As this is a new nested level, Task T4 is assigned nested level/instance 3A. Task T4 has data that takes up two cache lines as shown. After completion of Task T4, nested task T3 is resumed, but is preempted by task T5. Again, as task T5 is performed at nested level 3, and in order to distinguish task T5 from task T4, task T5 is assigned nested level/instance 3B.

Upon completion of task T5, nested task T3 is resumed. Upon completion of nested task T3, task T1 is resumed. During performance of task T1, a new task T6 comes in at nested level 2, taking up two cache lines. In order to distinguish task T6 from tasks T2 and T3, task T6 is assigned nested level/instance 2C. Upon completion of task T6, task T1 is resumed, but is again preempted by task T7. In order to distinguish task T7 from tasks T2, T3 and T6 at the second nested level, task T7 is assigned nested level/instance 2D.

The task processing flow and the nested level/instance assignment of each task is summarized in the below table 1.

TABLE 1

| | | |
|---|---|---|
| 1A: | started task T1 | |
| | 2A: | task T2 preempts task T1 |
| 1A: | task T2 is completed and task T1 is resumed | |
| | 2B: | task T3 preempts task T1 |
| | | 3A: task T4 preempts task T3 |
| | 2B: | task T4 is completed and task T3 is resumed |
| | | 3B: task T5 preempts task T3 |
| | 2B: | task T5 is completed and task T3 is resumed |
| 1A: | task T3 is completed and task T1 is resumed | |
| | 2C: | task T6 preempts task T1 |
| 1A: | task T6 is completed and task T1 is resumed | |
| | 2D: | task T7 preempts task T1 |

The above description of cache entries in cache memory 104 is by way of example only and will vary in further embodiments. The assignment of sequential nested levels and instances may be performed by processing unit 102, and the last assigned nested level and instance may be stored in cache memory 104 or other memory storage location (such as another level cache memory).

In the above description of FIG. 2, data for new tasks were added to cache memory 104 without having to replace existing cache entries. However, at some point, cache entries for new tasks will replace an existing cache entry. The stored nested level and instance enable a novel replacement module which will now be described with reference to the flowchart of FIG. 3.

Figure 3:
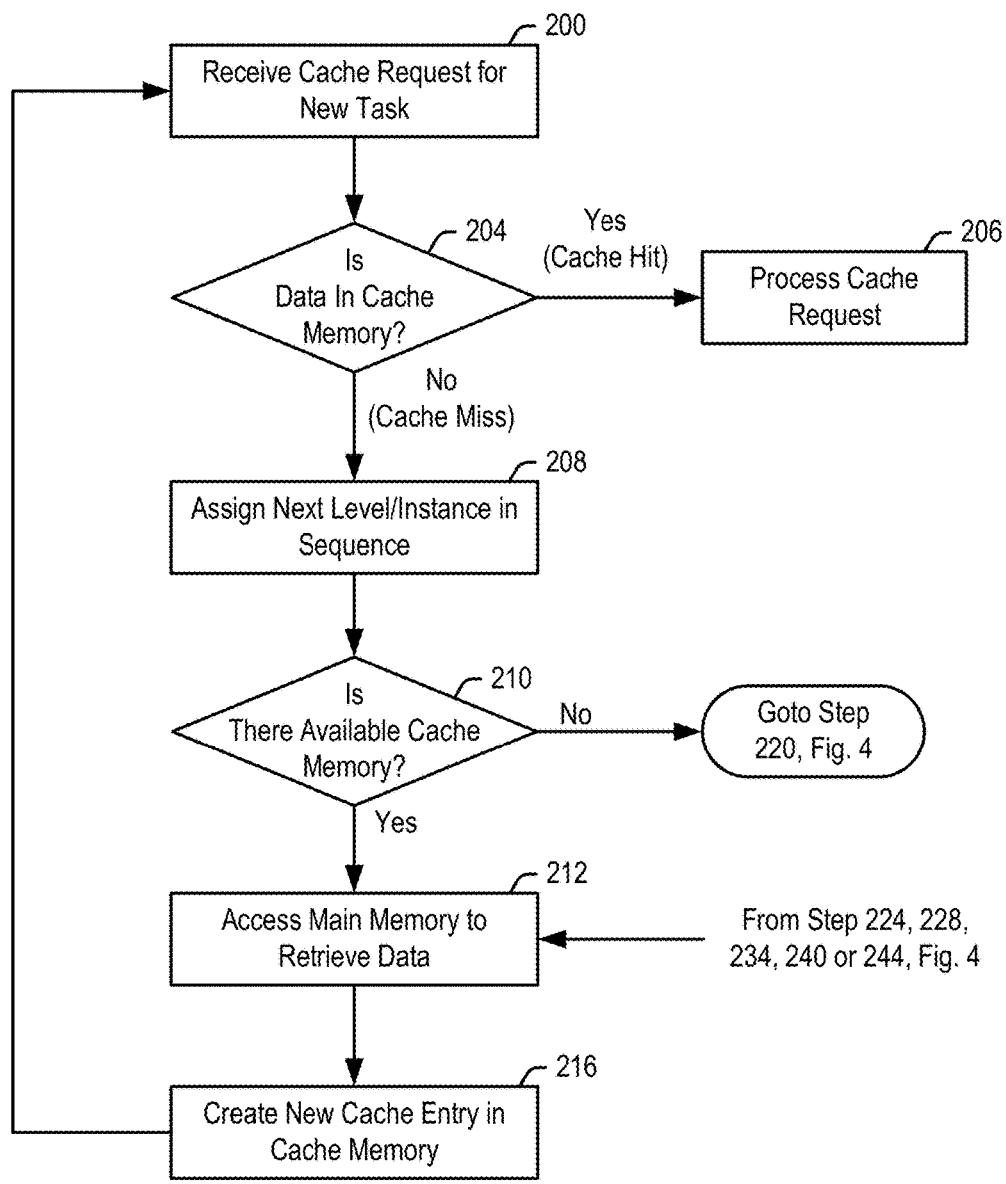
FIG. 3 is a flowchart showing a first portion of the operation of a replacement module according to embodiments of the present technology.

FIG. 3 describes how a cache entry 118 for a new task is added to cache memory 104 by the processing unit 102 operating at nested level n (n≥level 1). In step 200, a cache request is received. For instance, the cache memory 104 can receive a cache request for the processing unit 102 to perform a task at level n. At step 204, a determination is made as to whether the data identified in the cache request is included in the cache memory 104. If the data is in the cache memory, then there is a cache hit, and the method continues to step 206 where the cache memory 104 processes the cache request (e.g., reads or writes the data as specified by the cache request).

If the data is not in the cache memory, then there is a cache miss, and the processor 102 may then assign the next nested level and instance in the sequence to the new task in step 208 as explained above. For example, while performing a task at level m, the processor may receive a new preemptive task, to which the processor assigns a new, next incrementally higher level n, where n=m+1. If level n is a new level (tasks not previously performed at that level), the processor assigns the first instance, i, to the task at level n. If one or more tasks have been performed and completed at level n, the processor assigns the next sequentially higher instance after i at level n. A task will request cache entries (or have cache misses) many times while it is running. The assignment of the next level/instance will happen when the task starts. Cache entries for a task performed at a given level/instance will be assigned that same level instance. In embodiments, at some point in the use of cache 104, levels and/or instances may be recycled to again start at the first level and/or instance.

The method may then continue to step 210 where a determination is made as to whether there is any available cache memory (e.g., cache memory that does not already have data in it). If there is available cache memory, the method continues to step 212 where the cache memory issues a cache miss request to the main memory 108. In embodiments including a hierarchy of cache levels, the cache memory may issue a cache miss request to the next higher-level cache memory in step 212. In step 216, the new cache entry 118 is created in the cache memory 104.

If, on the other hand, there is not available cache memory at step 208, then the cache controller needs to replace an existing cache entry 118 according to the replacement module, as will now be described with reference to FIG. 4. In step 220, the cache memory determines first whether any of the cache entries 118 have an 'invalid' status. If so, those get replaced first in step 224. If there are no invalid cache entries in step 220, the cache memory looks for an existing cache line at a level greater than n. By definition, in the nested preemption scheme, cache entries at a level higher than n would have already been completed. If an existing cache entry higher than n is found, it may be replaced in step 228. If there are multiple entries higher than n, then one may be selected for replacement according to a predefined rule. For example, the highest or lowest level entry greater than n may be replaced, or if multiple instances exist at a higher level, the highest or lowest instance may be replaced.

If there are no higher level entries than level n in step 226, the cache memory looks in step 230 for an existing cache line at level n, but with a different instance indicator than the new task. By definition, a new instance at a given level is not created unless a task with an earlier instance has been completed. If an existing cache entry is found at level n but having a different instance, it may be replaced in step 234. If there are multiple other instances at level n exist, then the cache line associated with one instance may be selected for replacement according to a predefined rule.

If there is no other cache line at level n with a different instance in step 230, the cache memory looks in step 238 for an existing cache line at a level lower than n. If an existing cache entry lower than n is found, the cache memory takes the cache entry at the lowest level and that cache line is replaced in step 240. The tasks associated with cache lines at a level lower than n have not yet been completed. However, the lowest level cache line is selected as this task will be performed last in time relative to other cache lines that are lower level than level n. It is understood that cache lines lower than n but higher than the lowest level may be selected first for replacement in step 240 in further embodiments.

If the method makes it through the flow without satisfying the conditions of steps 220, 226, 230 and 238, the sole remaining possibility is that the cache entries are the same level n and the same instance as the new task. Thus, if the flow proceeds past step 238, the cache memory replaces a cache entry which is the same level n and the same instance in step 244. Once the method of FIG. 4 identifies the cache entry to replace in one of steps 224, 228, 234, 240 or 244, the method returns to step 212, FIG. 3, where the cache memory issues a cache miss request to the main memory 108. In step 216, the identified cache entry is evicted, and the new cache entry 118 is created in the cache memory 104 at the replaced location.

Figure 4:
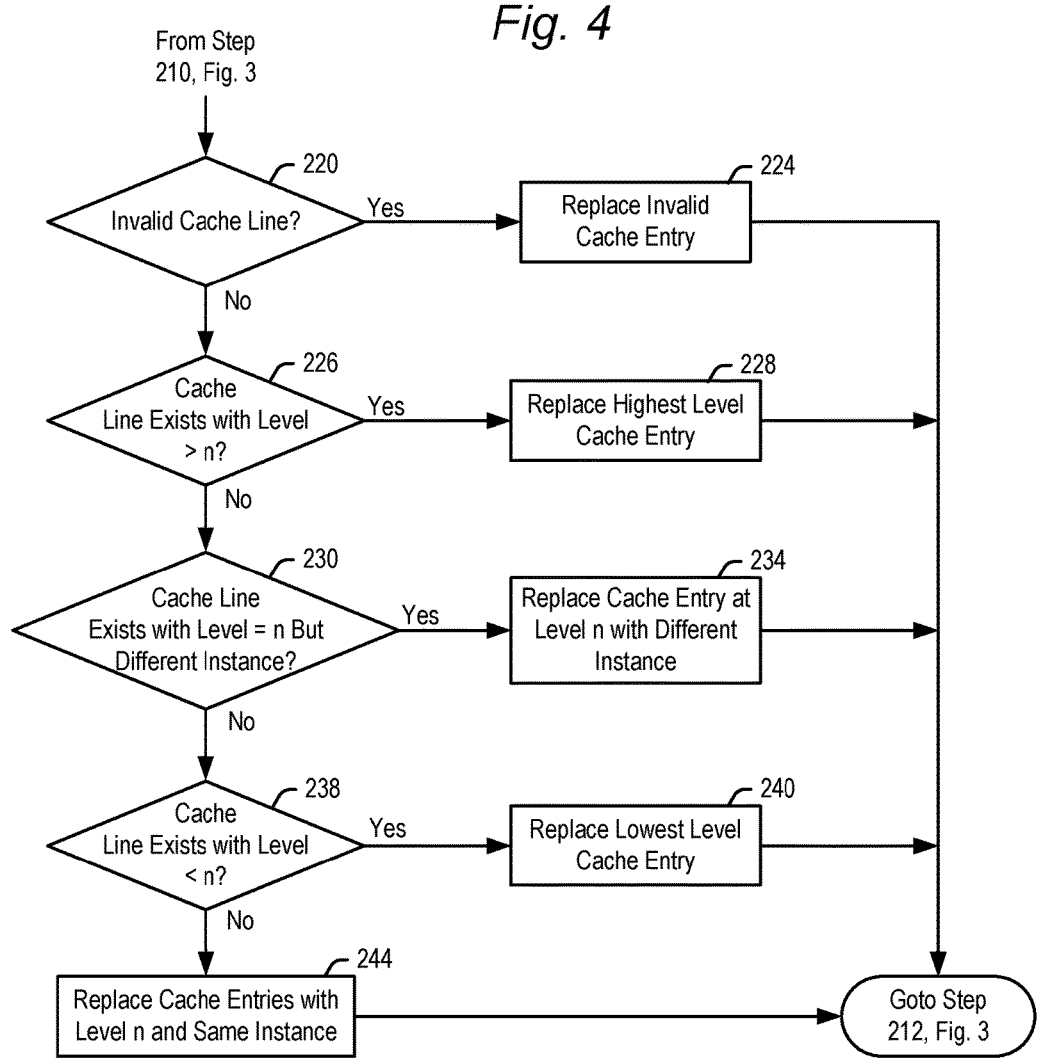
FIG. 4 is a flowchart showing a second portion of the operation of a replacement module according to embodiments of the present technology.

FIGS. 5-8 illustrate examples of the replacement module as set forth in FIGS. 3-4. FIG. 5 illustrates a cache memory 104 similar to that shown in FIG. 2, with sole change that task T7 described above has been completed so that the processor resumes task 1A at level 1. In the example of FIG. 5, assume further that the processor was performing task T1 at nested level n=1 when a new preemptive task T8 comes in. In step 208, the processing unit 102 increments the nested task level by one and assigns task T8 nested level n=2. Because tasks T2, T3, T6 and T7 have already been performed at level 2, task T8 is assigned the next incremental instance at level 2 (i.e., instance E).

In the example of FIG. 5, all status bits are assumed to be valid so that the method skips past the status bit check of step 220. At step 226 the replacement module checks the cache memory for a cache line with a level greater than 2. In the example of FIG. 2, the cache lines 4, 5 and 6 each store data for nested level 3. As these tasks would have already been performed if the processor is performing a level 2 task, one of them gets replaced in step 228. In the example of FIG. 5, cache line 4 is replaced with cache line 10 for task T8, though it is understood that cache line 5 or cache line 6 could be replaced in further embodiments.

FIG. 6 illustrates a cache memory 104 similar to that shown in FIG. 5, but while the processor is performing task T8 at nested level/instance 2E, a new preemptive task T9 comes in. In step 208, the processing unit 102 assigns task T9 nested level 3. Because tasks T4 and T5 have already been performed at nested level 3, Task T9 is assigned the next incremental instance at level 3 (i.e., instance C).

At step 226 the replacement module checks the cache memory for a cache line with a level greater than 3. None are found. The replacement module next checks in step 230 for a cache line with a level equal to 3, but with a different instance than that assigned to task T9 (task T9 was assigned instance C as noted above). In the example of FIG. 5, the cache lines 5 and 6 each store data for nested level 3, with different instances than C. As these tasks would have already been performed if the processor is performing instance C at level 3, one of them gets replaced in step 234. In the example of FIG. 6, cache line 6 is replaced with cache line 11 for task T9, though it is understood that cache line 5 could be replaced in further embodiments.

FIG. 7 illustrates a cache memory 104 similar to that shown in FIG. 6, but while the processor is performing task T9 at nested level/instance 3C, a new preemptive task T10 comes in. In step 208, the processing unit 102 assigns task T10 nested level 4. There are no tasks that have been performed at nested level 4, so the instance assigned is the first instance at nested level 4 (i.e., instance A).

At step 226 the replacement module checks the cache memory for a cache line with a level greater than 4. None are found. At step 230, the replacement module checks for a cache line with a level equal to 4, but with a different instance than that assigned to task T10. None are found. In step 238, the replacement module checks for a cache line at a level less than 4. All cache lines shown in FIG. 7 meet this condition. These tasks have yet to be completed, so the replacement module selects the task that is to be performed in the most distant future—task T1 in the example of FIG. 6. It is understood that a cache line for tasks other than T1 could have been selected in further embodiments. The data for task T1 is replaced with the data for task T10 as shown in FIG. 7.

Figure 8:
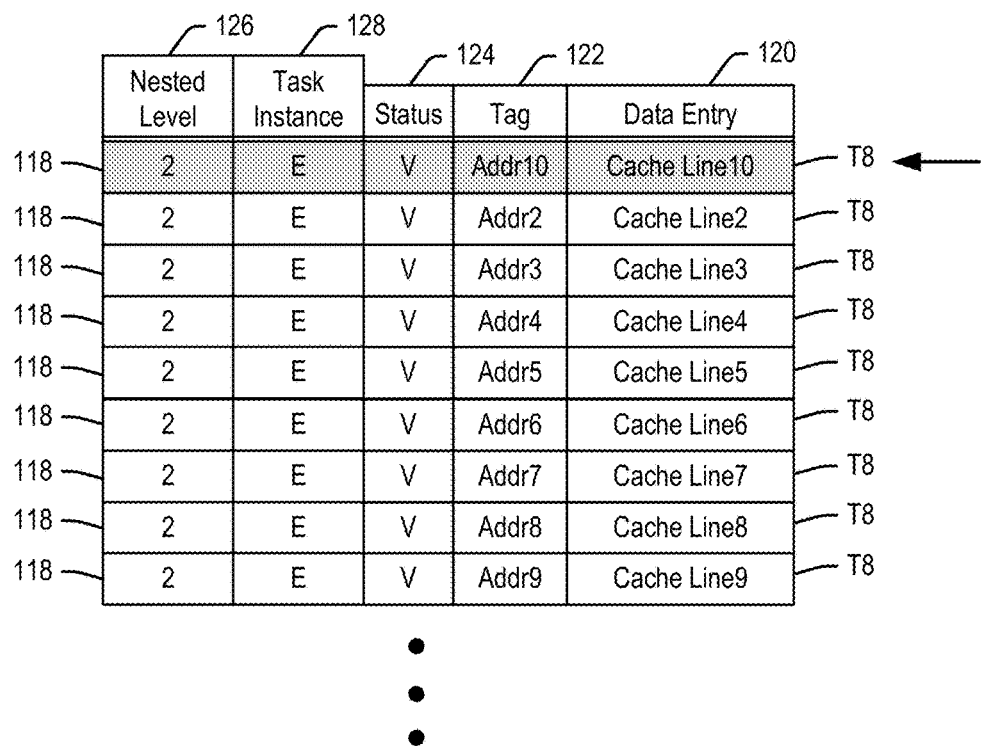

FIG. 8 illustrates an example of cache memory 104 where all entries are filled with data for task T8, being performed for example at nested level 2, instance E. In earlier replacement operations (not shown), the replacement module replaced all lower level (n=1) cache entries, all higher level (n>2) cache entries, and all instances at level 2 other than instance E. Thus the method passes by steps 226, 230 and 238, and performs step 244 of replacing a cache entry with level 2, instance E. All cache entries in FIG. 8 meet this condition, so one may be selected according to a predefined rule, such as for example the lowest cache line. Thus, in FIG. 8, cache line 1 is replaced with cache line 10. Other cache lines could have been selected for replacement in the example of FIG. 8 according to other predefined rules applicable to this condition of the cache memory 104.

The replacement module described above reduces CRPD a number of ways. Cache lines for completed tasks may be replaced first. Cache lines that are unlikely to be called again are replaced next. Next, cache lines are replaced that will be called last. By preferring to evict cache lines of completed tasks (level >n) over task lines of preempted tasks (level <n), this model reduces CRPD more effectively than conventional solutions.

The order in which the replacement module performs the steps 220, 226, 230 and 238 provides an efficient method of replacing cache entries, in that data that is most likely to be used in the near future for performing scheduled tasks is least likely to be replaced. This minimizes the likelihood of a cache miss in performing these scheduled tasks. However, it is understood that steps 220, 226, 230 and 238 may be performed in any of a variety of other orders in further embodiments. It is further understood that the replacement module may perform other steps in addition to, or instead of, one or more of steps 220, 226, 230 and/or 238 to determine which cache entries are replaced when space is needed for new cache entries.

In embodiments, the present technology may include just the replacement module as described above with respect to FIGS. 1-8. However, in further embodiments, the present technology may further include a recovery module for replacement of evicted cache lines as will now be described with reference to FIGS. 9-11.

Figure 9:
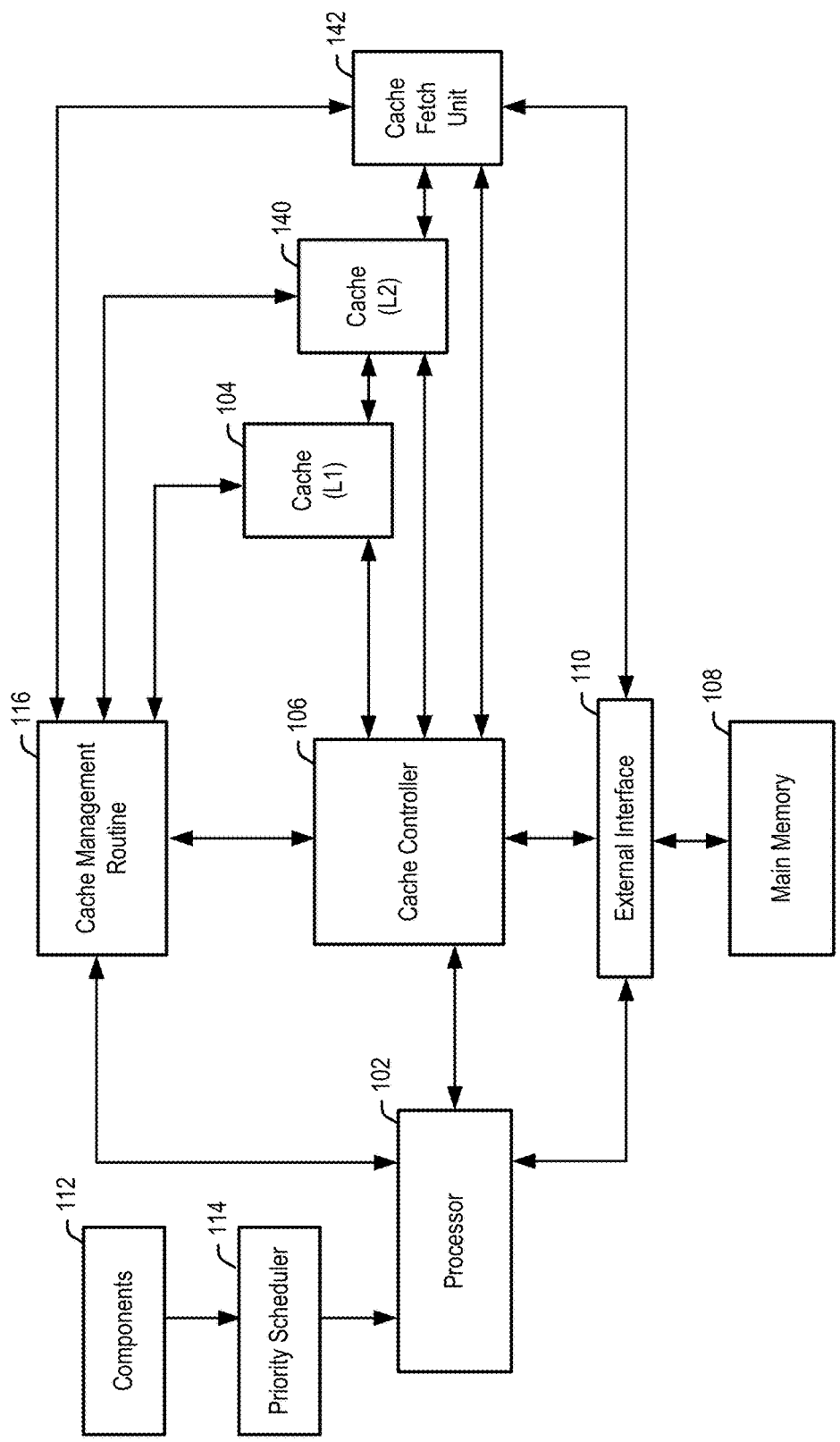
FIG. 9 is a schematic illustration of a computing device according to a further embodiment of the present technology.

FIG. 9 illustrates a schematic block diagram of a computing device 100 implementing a cache management module 116 including a cache replacement module and a cache recovery module. The computing device 100 of FIG. 9 is similar to the computing device 100 of FIG. 1, but further includes a second cache memory 140 and a cache fetch unit 142. The embodiment of FIG. 9 includes a cache 104 as described above, but in the embodiment of FIG. 9, cache memory 104 may be a level 1 cache, and cache memory 140 may be a level 2 cache. In embodiments, cache memory 140 may further be a set of first in-first out (FIFO) memory buffers, and may be any of a variety of high speed memory components including for example SRAM.

The recovery module leverages off of the probability that, when cache lines are evicted for levels ≤n, they are likely to contain victim data and be used again when the lower level preempted task resumes. Thus, when a cache line for a level less than the current level n is evicted, the cache line is remembered and pre-fetched when the preempted task resumes to further reduce CRPD. In embodiments, this is accomplished by placing an evicted cache line for a preempted task in FIFO cache memory 140. When the task resumes, the cache fetch unit 142 restores the latest cache line back to cache memory 104. As described above, when replacing cache entries, they are replaced in an order where least likely to be used later entries are evicted first and most likely to be used later entries are evicted last. Thus, by fetching the last entry in FIFO cache memory 140 first, that is most likely to be a cache entry that will be needed first when a preempted task resumes.

Figure 10:
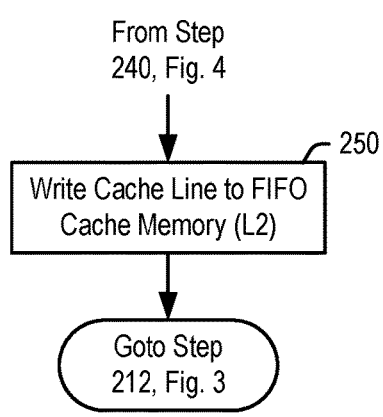
FIG. 10 is an addition to the flowchart of FIGS. 3 and 4 for operating with the embodiment of FIG. 9.

In order to operate with the recovery module, a simple modification of the replacement module may be made as shown in the flowchart of FIG. 10. In particular, referring back to the flowchart of FIG. 4, if the flow makes it to step 240, this means that a cache line for a preempted task (level <n) is being replaced with a cache line for higher level task (at level n). Referring to FIG. 10, after identifying the cache line for the preempted task being replaced in step 240, that cache line is written to the FIFO cache memory 142 in step 250. The remaining steps of the replacement module are as described above. Cache lines evicted as a result of step 244 (evicting cache entries having the same level and instance as current task) may also be stored in FIFO cache memory 142 according to this embodiment and recovered as explained below.

Figure 11:
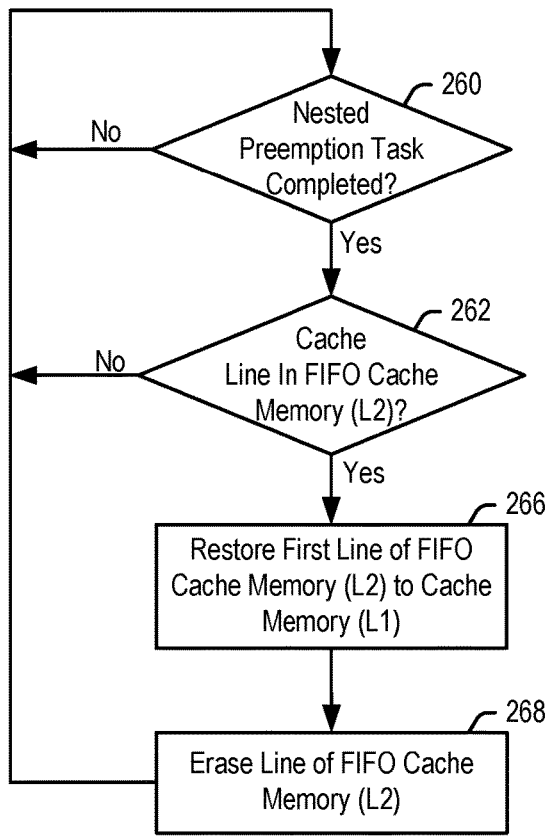
FIG. 11 is a flowchart showing the operation of a recovery module according to embodiments of the present technology.

The operation of the recovery module will now be explained in greater detail with reference to the flowchart of FIG. 11. In step 260, the recovery module determines whether a nested preemption task has been completed and a lower level task resumes. If so, in step 262, the recovery module checks whether there are any cache entries in the FIFO cache memory 140. If so, that cache entry is fetched by the cache fetch unit 142 back into the L1 cache memory 104 in step 266. A task may have multiple entries to recover. They may all be recovered when the preempted task resumes. It is noted that the cache line that gets recovered into the cache memory 104 may replace an existing cache entry in cache memory 104 using the above-described steps of the replacement module. Once a cache entry is recovered from the FIFO cache memory 140, it may be removed from the FIFO cache memory 140 in step 268.

Thus, referring back to the example of FIG. 7 where data for a preempted task T1 at level 1 was replaced with a task T8, the recovery module may write the evicted cache line for task T1 into the FIFO cache memory 140 for level 1. Thereafter, when task 8 is completed, the processor may resume a lower level task, which may be preempted task T1 at level 1 or some other task at a level below task 8. At that point, the cache lines for task T1 in the level 1 FIFO may be fetched by the cache fetch unit 142 and recovered into cache memory 104.

The recovery module attempts to recover a cache line for a preempted task into the cache memory 104 before it is needed by the processing unit 102. If a task needs an entry in cache memory 104 before it is recovered from the FIFO cache memory 140, the cache memory 104 simply takes a cache miss as before, and there is no penalty for the operation of the recovery mechanism.

In the embodiments of the recovery module described above, the FIFO cache memory 140 may store the actual victim data that is evicted from the cache memory 104. However, in further embodiments, the FIFO cache memory 140 may store the address in main memory 108 where the evicted data is stored. In this instance, the cache fetch unit would fetch the address from FIFO cache memory of the cache line to be restored, and then retrieve the data from that address in the main memory 108.

While embodiments of the present technology described above may be used in the case of nested task preemption, they could be used at the function call level for a single application. This could be particularly effective when all the parameters are passed by value to the called routines. In further embodiments, the present technology may be used by interrupt service routines which are frequently nested.

Figure 12:
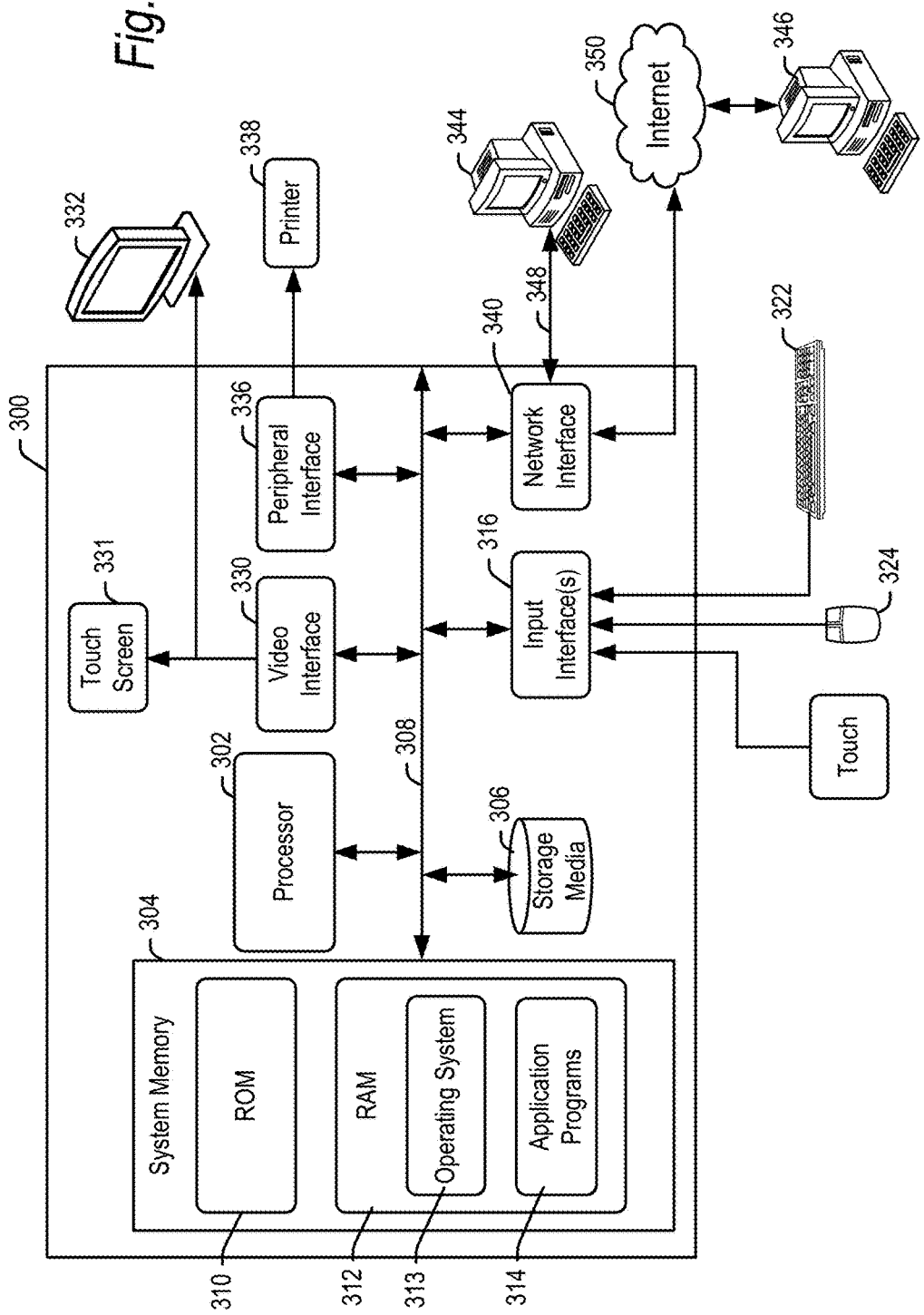
FIG. 12 is a block diagram of an example computing device for implementing a power management method and other aspects of the present technology.

FIG. 12 illustrates details of a computing device 300, which may be an example of computing device 100 described above with respect to FIGS. 1 and 9. Components of computing device 300 may include, but are not limited to, a processor 302, a system memory 304, computer readable storage media 306, various system interfaces and a system bus 308 that couples various system components. The system bus 308 may be any of several types of bus structures including a memory bus or memory controller, a peripheral bus, and a local bus using any of a variety of bus architectures. The processing unit 130, system memory 132, nonvolatile memory 144 and bus 136 of FIG. 2 may be examples of processor 302, a system memory 304, storage media 306 and system bus 308, respectively.

The computing device 300 may include computer readable media. Computer readable media can be any available tangible media that can be accessed by the computing device 300 and includes both volatile and nonvolatile media, removable and non-removable media. Computer readable media does not include transitory, modulated or other transmitted data signals that are not contained in a tangible media. The system memory 304 includes computer readable media in the form of volatile and/or nonvolatile memory such as ROM 310 and RAM 312. RAM 312 may contain an operating system 313 for computing device 300. RAM 312 may also execute one or more application programs 314, including for example the policy agent 140. The computer readable media may also include storage media 306, such as hard drives, optical drives and flash drives.

The computing device 300 may include a variety of interfaces for the input and output of data and information. Input interface 316 may receive data from different sources including touch (in the case of a touch sensitive screen), a mouse 324 and/or keyboard 322. A video interface 330 may be provided for interfacing with a touchscreen 331 and/or monitor 332, such as display 160. A peripheral interface 336 may be provided for supporting peripheral devices, including for example a printer 338.

The computing device 300 may operate in a networked environment via a network interface 340 using logical connections to one or more remote computers 344, 346. The logical connection to computer 344 may be a local area connection (LAN) 348, and the logical connection to computer 346 may be via the Internet 350. Other types of networked connections are possible, including broadband communications as described above. It is understood that the above description of computing device 300 is by way of example only, and may include a wide variety of other components in addition to or instead of those described above.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device for nested preemption with a cache replacement policy, comprising:
    a cache memory comprising a plurality of cache entries, each cache entry being assigned a nested level of the cache entry, and an instance identifier (ID) at the nested level;
    a non-transitory memory storage memory comprising instructions;
    one or more processors in communication with the non-transitory memory storage memory, wherein the one or more processors execute the instructions to
        receive a new preemptive task assigned a next successive incremental nested level n and assigned a next successive incremental instance ID x of the nested level n, the new preemptive task at level n preempting a task in progress at a nested level m less than n, and
        manage operations of the cache memory to evict one of the cache entries and replace the evicted cache entry with a new cache entry for the new preemptive task, wherein the evicted cache entry is based on the nested level and the instance ID of the new preemptive task and of each cache entry such that completed tasks are first evicted and replaced in the cache memory and tasks with an upcoming function call are last evicted and replaced from the cache memory.

2. The computing device of claim 1, wherein the evicted cache entry is one of:
    (a) a cache entry in the cache memory with invalid data;
    (b) a cache entry in the cache memory at the nested level higher than n;
    (c) a cache entry in the cache memory at the nested level n and with the instance ID different than x;
    (d) a cache entry in the cache memory at the nested level lower than n; or
    (e) a cache entry in the cache memory at the nested level n and with the instance ID x.

3. The computing device of claim 2, wherein the one or more processors execute the instructions to select (a) as the evicted cache entry to be replaced before (b)-(e); select (b) as the evicted cache entry to be replaced before (c)-(e); select (c) as the evicted cache entry to be replaced before (d) and (e); and select (d) as the evicted cache entry to be replaced before (e).

4. The computing device of claim 1, wherein the one or more processors execute the instructions to assign the nested level n and the instance ID x to the new cache entry.

5. The computing device of claim 1, further comprising a FIFO second level cache memory; and wherein the one or more processors execute the instructions to store the selected cache entry in the FIFO second level cache memory.

6. The computing device of claim 5, wherein the one or more processors execute the instructions to recover the selected cache entry into the cache memory from the FIFO second level cache memory upon completion of the new preemptive task.

7. A computer-implemented method for nested preemption with a cache replacement policy, the cache memory comprising a plurality of cache entries, each cache entry being assigned a nested level of the cache entry, and an instance identifier (ID) at the nested level, the method comprising:
    receiving a preemptive task assigned a next successive incremental nested level n and assigned a next successive incremental instance ID x of the nested level n when performing a first task at a nested level m, wherein n>m;

suspending the first task at the nested level m;
performing the preemptive task assigned the nested level n,
selecting a cache entry based on the nested level and the instance ID of the preemptive task and of each cache entry; and
replacing the selected cache entry with a new cache entry for the preemptive task such that completed tasks are first replaced in the cache memory and tasks with an upcoming function call are last replaced from the cache memory.

8. The method of claim 7, wherein the evicted cache entry is one of:
(i) a cache entry in the cache memory at a nested level higher than n;
(ii) a cache entry in the cache memory at the nested level n and with the instance ID different than x, and
(iii) a cache entry in the cache memory at a nested level lower than n.

9. The method of claim 8, wherein the cache entry in (i) is replaced before the cache entry in (ii) and (iii).

10. The method of claim 8, wherein the cache entry in (ii) is replaced before the cache entry in (iii).

11. The method of claim 8, wherein the evicted cache entry is: (iv) a cache entry in the cache memory with invalid data or (v) a cache entry in the cache memory at the nested level n and with the instance ID x.

12. A computer-implemented method for nested preemption with a cache replacement policy, the cache memory comprising a plurality of cache entries, each cache entry being assigned a nested level of the cache entry, and an instance identifier (ID) at the nested level, the method comprising:
fetching a selected cache entry from a cache buffer, the selected cache entry fetched from the cache buffer being a cache entry that was evicted from the cache memory and replaced by a preemptive task assigned a next successive incremental nested level n and assigned a next successive incremental instance ID x of the nested level n, wherein the selected cache entry for completed tasks are first evicted from the cache memory and tasks with an upcoming function call are last evicted from the cache memory; and
recovering the evicted cache entry back into the cache memory, wherein the selected cache entry is assigned the next successive incremental nested level n and assigned the next successive incremental instance ID x.

13. The method of claim 12, wherein the evicted cache entry is the latest cache entry stored in the cache buffer.

14. The method of claim 12, wherein the evicted cache entry is a cache entry evicted from the cache memory for an uncompleted task.

15. A non-transitory computer-readable medium storing computer instructions for nested preemption with a cache replacement policy, that when executed by one or more processors, cause the one or more processors to perform the steps of:
configure a cache memory comprising plurality of cache entries, wherein each cache entry being assigned a nested level, and each cache entry being assigned an instance identifier (ID) indicating respective tasks at the nested level;
receive a preemptive task assigned a next successive incremental nested level n and assigned a next successive incremental instance ID x of the nested level n when performing a first task at a nested level m, wherein n>m;
suspend the first task at the nested level m;
perform the preemptive task at the nested level n;
select a cache entry based on the nested level and the instance ID of the preemptive task and of each cache entry such that the cache entry for completed tasks are first selected and the cache entry for tasks with an upcoming function call are last selected; and
replace the selected cache entry in the cache memory with a new cache entry for the preemptive task at the nested level n and the instance ID x.

16. The non-transitory computer-readable medium of claim 15, wherein the cache entry is one of:
(a) a cache entry in the cache memory with invalid data;
(b) a cache entry in the cache memory at the nested level higher than n;
(c) a cache entry in the cache memory at the nested level n and with the instance ID different than x;
(d) a cache entry in the cache memory at the nested level lower than n; or
(e) a cache entry in the cache memory at the nested level n and with the instance ID x.

17. The non-transitory computer-readable medium of claim 15, further comprising the steps of:
recover an evicted cache entry back into the cache memory from a buffer upon completion of a task, the evicted cache entry being a cache entry that was previously evicted from the cache memory and has a highest level pending function call.

18. The non-transitory computer-readable medium of claim 17, wherein the evicted cache entry is added to a FIFO buffer.

19. The non-transitory computer-readable medium of claim 17, wherein the evicted cache entry being the selected cache entry replaced by the new cache entry for the preemptive task.

* * * * *